United States Patent
Pawson et al.

(10) Patent No.: US 6,722,124 B2
(45) Date of Patent: Apr. 20, 2004

(54) CATALYTIC CONVERTER

(75) Inventors: Kenneth Pawson, East Haddon (GB); Robert David Godrich, Leicester (GB)

(73) Assignee: Nelson Burgess Limited, Hinckley (GB)

( * ) Notice: Subject to any disclaimer, the term of this patent is extended or adjusted under 35 U.S.C. 154(b) by 0 days.

(21) Appl. No.: 10/158,763

(22) Filed: May 30, 2002

(65) Prior Publication Data

US 2003/0110763 A1 Jun. 19, 2003

(30) Foreign Application Priority Data

Jun. 1, 2001 (GB) ............................................. 0113226

(51) Int. Cl.⁷ ............................................... F01N 3/00
(52) U.S. Cl. ............................. 60/286; 60/295; 60/296; 60/303; 60/324; 422/172; 422/182; 422/183
(58) Field of Search .......................... 60/286, 295, 296, 60/300, 303, 316, 324; 422/172, 176, 182, 183, 180, 177

(56) References Cited

U.S. PATENT DOCUMENTS

| | | | |
|---|---|---|---|
| 5,272,871 A | * 12/1993 | Oshima et al. | ................ 60/274 |
| 5,431,893 A | * 7/1995 | Hug et al. | ................ 423/239.1 |
| 5,572,866 A | * 11/1996 | Loving | .......................... 60/274 |
| 5,829,248 A | * 11/1998 | Clifton | .......................... 60/286 |
| 6,444,177 B1 | 9/2002 | Muller et al. | |
| 6,449,947 B1 | * 9/2002 | Liu et al. | ...................... 60/286 |
| 2002/0162322 A1 | * 11/2002 | Ganzmann et al. | ........... 60/286 |
| 2003/0079467 A1 | * 5/2003 | Liu et al. | ...................... 60/286 |

FOREIGN PATENT DOCUMENTS

| EP | 0 555 746 A | | 8/1993 | |
|---|---|---|---|---|
| GB | 2 161 397 A | | 1/1986 | |
| GB | 2381218 A | * | 4/2003 | ................ 60/286 |
| JP | 57 171425 A | | 1/1983 | |

OTHER PUBLICATIONS

Anonymous: "Selective Catalytic Reduction" Dieselnet Technology Guide, xx, xx Online Aug. 2000, pp. 1–12, XP002163384, Retrieved from the Internet: <URL: www.dieselnet.com> retrieved on Jun. 11, 2003 p. 10.

* cited by examiner

Primary Examiner—Binh Tran
(74) Attorney, Agent, or Firm—Woodard, Emhardt, Moriarty, McNett & Henry LLP

(57) ABSTRACT

A catalytic converter assembly comprises a housing having an exhaust gas inlet and an exhaust gas outlet. A first chamber enclosed by the housing receives incoming exhaust gas and a second chamber contains a catalyst bed. Gas flows from the first chamber to the second chamber through an exhaust gas passage. A perforated enclosure surrounds the gas passage within said first chamber to induce a region of turbulence in the exhaust gas flow within the enclosure immediately upstream of the passage; An injector extends into the enclosure for injecting a reducing agent into the region of turbulence so that the reducing agent is rapidly dispersed and mixed within the exhaust gas flow before reaching the catalyst bed.

12 Claims, 3 Drawing Sheets

CATALYTIC CONVERTER

FIELD OF THE INVENTION

The present invention relates to a catalytic converter assembly and in particular to a deNO$_x$ Catalytic Converter for reducing the nitrogen oxide (NO$_x$) emissions from an internal combustion engine. More particular still, the invention relates to a selective catalytic reduction (SCR) system.

BACKGROUND OF THE INVENTION

The exhaust emissions of internal combustion engines, and in particular diesel engines, tend to have high NO$_x$ content. A conventional method of combating this problem is to remove NO$_x$ from the exhaust gas using a catalytic converter located in the exhaust line. A particularly effective and proven system is to reduce the NO$_x$ to N$_2$ and water in a suitable catalytic converter in the presence of ammonia. This is known as selective catalytic reduction (SCR).

In a typical SCR system the ammonia is produced by spraying an aqueous solution of urea into the exhaust stream upstream of the catalytic converter. At the high exhaust temperatures the water in the solution rapidly evaporates leaving solid urea which decomposes into ammonia when it reaches a temperature of around 150° C. In order to ensure that there is the necessary reaction time to produce the ammonia from the urea, the urea solution is typically sprayed into the exhaust line between about 0.5 meters and 1 meter upstream of the catalytic converter. This is important to ensure that the urea both decomposes into ammonia and that the ammonia is adequately mixed in the exhaust gas steam.

The need to have a significant length of exhaust line between the point at which the urea is sprayed into the exhaust gas and the location of the catalyst limits the extent to which the size of the exhaust system can be minimised. There is however demand to have a compact exhaust system requiring as little space as possible for installation and operation. For instance, U.S. Pat. No. 5,832,720 proposes reducing the space requirement of an exhaust system by combining the catalytic converter with a noise reducing muffler by effectively utilising catalyst blocks as muffler elements. This does not however address the problem of the required separation of the urea spray and the catalyst.

U.S. Pat. No. 5,643,536 proposes a urea/ammonia metering system involving the provision of a hydrolysis catalytic converter to hydrolyse the urea into ammonia and water rather than relying on decomposition of the urea in the exhaust gas stream. Urea is introduced into the exhaust gas by spraying the urea into a chamber upstream of the hydrolyser in which it mixes with exhaust gas (perforated plates are provided within this chamber to prevent the urea solution from depositing on the walls of the chamber). This eliminates the need to have a substantial exhaust gas flow between the point of introduction of the urea and the catalyst blocks at the expense of a more complex and thus more expensive system.

The problems of the space requirement of conventional SCR exhaust systems are even greater in systems including a particle filter (typically incorporated in the exhaust system of a diesel engine). Conventional particle filters have catalyst coatings that destroy ammonia and thus must be located in the exhaust line upstream of the urea spray. This necessitates having two separate "boxes" in the exhaust system, one containing the particle filter and the other housing the SCR catalyst, the two being separated by a length of pipe into which the urea is sprayed.

OBJECT OF THE INVENTION

It is an object of the present invention to obviate or mitigate the above disadvantages.

SUMMARY OF THE INVENTION

According to the present invention there is provided a catalytic converter assembly comprising:

a housing having an exhaust gas inlet and an exhaust gas outlet, an exhaust gas flow path being defined through the housing from said inlet to said outlet;

a first chamber enclosed by the housing receiving incoming exhaust gas;

a second chamber enclosed by the housing downstream of said first chamber and containing a catalyst bed;

an exhaust gas passage from said first chamber to said second chamber;

a perforated enclosure surrounding said passage within said first chamber to induce a region of turbulence in the exhaust gas flow within said enclosure immediately upstream of said passage;

an injector extending into said enclosure for injecting a reducing agent into said region of turbulence;

whereby the reducing agent is rapidly dispersed and mixed within the exhaust gas flow before reaching the catalyst bed.

Injection of the reducing agent into a region of turbulence in accordance with the present invention has been found to accelerate the dispersal and mixing process to a significant extent. For instance, in an SCR system in which a aqueous solution of urea is injected into the exhaust, the decomposition of the urea to produce ammonia is accellerated to such an extent that it is not necessary to have any significant length of exhaust gas flow between the point of injection of the urea solution and the catalyst. This enables the construction of an extremely simple and compact catalytic converter assembly. For instance, the first and second chambers maybe immediately adjacent one another separated only by a thin partition wall within the housing. Such an arrangement is not possible with the prior art SCR systems mentioned above.

It will be appreciated that the catalytic converter housing may define further chambers in addition to the "first" and "second" chambers identified above. For instance sound attenuating muffler chambers may be provided between the inlet and the chamber referred to as the "first" chamber.

The perforated enclosure may take a variety of forms. In preferred embodiments the enclosure is defined by a tube which extends from the first chamber and which is perforated by the provision of holes in that portion of the tube which lies within the first chamber.

Embodiments of the invention may include a particle filter located within the first chamber upstream of the perforated enclosure. Thus, the invention can provide a compact catalytic converter which includes a filter thus avoiding the need to have a separate filter box upstream of the converter.

Further objects, advantages and preferred features of the present invention will be apparent from the following description.

BRIEF DESCRIPTION OF THE DRAWINGS

Specific embodiments of the present invention will now be described, by way of example only, with reference to the accompanying drawings, in which.

DETAILED DESCRIPTION OF THE PREFERRED EMBODIMENT

Each of the illustrated embodiments of the invention is an SCR catalytic converter designed for inclusion in a vehicle exhaust system, such as the exhaust system of a heavy duty truck powered by a diesel engine. As such it would be understood that the catalytic converter is designed to be installed in an exhaust line having additional components (such as filter assemblies, muffler boxes etc) upstream and/or downstream of the catalytic converter in a conventional way.

Figure 1:
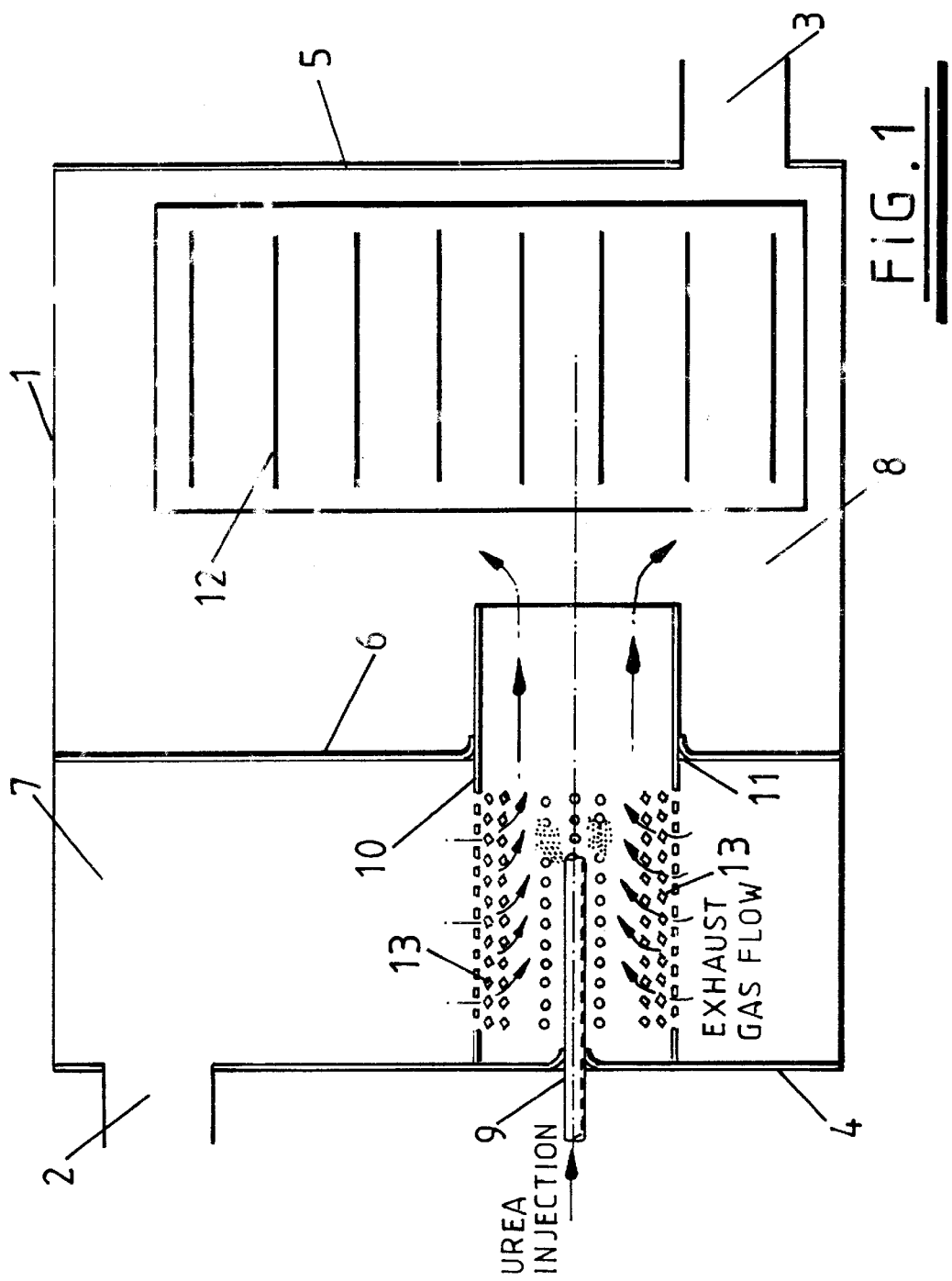
FIG. 1 is a schematic illustration of a first embodiment of an SCR catalytic converter in accordance with the present invention.

Referring first to FIG. 1, the illustrated catalytic converter comprises a housing 1 provided with an upstream exhaust gas inlet 2 and a downstream exhaust gas outlet 3 located in respective housing end walls 4 and 5. An internal wall 6, which lies parallel to the end walls 4 and 5, divides the internal space of the housing 1 into upstream and downstream chambers 7 and 8 respectively.

An injector pipe 9 for a urea/water solution extends into the upstream chamber 7 through the side wall 4 and is surrounded by a cylindrical tube 10 which extends from the inner surface of the end wall 4 and into the downstream chamber 8 through an aperture 11 provided in the inner wall 6. The downstream chamber 8 houses a catalyst bed 12, i.e. an SCR block of a suitable catalytically active material, located between the open end of the tube 10 and the exhaust gas outlet 3.

The portion of the tube 10 which lies within the downstream chamber 7 is "perforated" with an array of holes 13. Exhaust gas entering through the exhaust gas inlet 2 thus flows into the upstream chamber 7 around the tube 10, into the tube 10 through the holes 13 and then through the downstream chamber 8 to the exhaust gas outlet 3 passing through the SCR block 12.

The urea injection pipe 9 extends axially within the tube 10 to spray urea into the exhaust gas flow as it enters the tube 10 through the holes 13. The delivery system for delivering urea to the injection pipe 9 may be entirely conventional typically comprising a urea/water storage tank, a pump and a metering system for controlling the rate of urea delivery. Since these components may be entirely conventional they will not be described in any further detail.

In use, flow of the exhaust gas into the tube 10 through the holes 13 creates substantial turbulence within the interior of the tube 10. The urea is sprayed directly into this region of high turbulence as a result of which the urea/water solution is very rapidly dispersed and mixed within the exhaust gas. The rapidity of this mixing greatly accelerates the decomposition process producing the ammonia necessary for the catalytic reduction within the downstream chamber 8. There is therefore no need for any substantial length of pipe between the point of introduction of the urea into the exhaust gas flow and the SCR blocks so that the resulting catalytic converter structure can be extremely compact as illustrated. Such a compact, yet simple, structure is not possible with the prior art SCR systems mentioned above.

Figure 2:
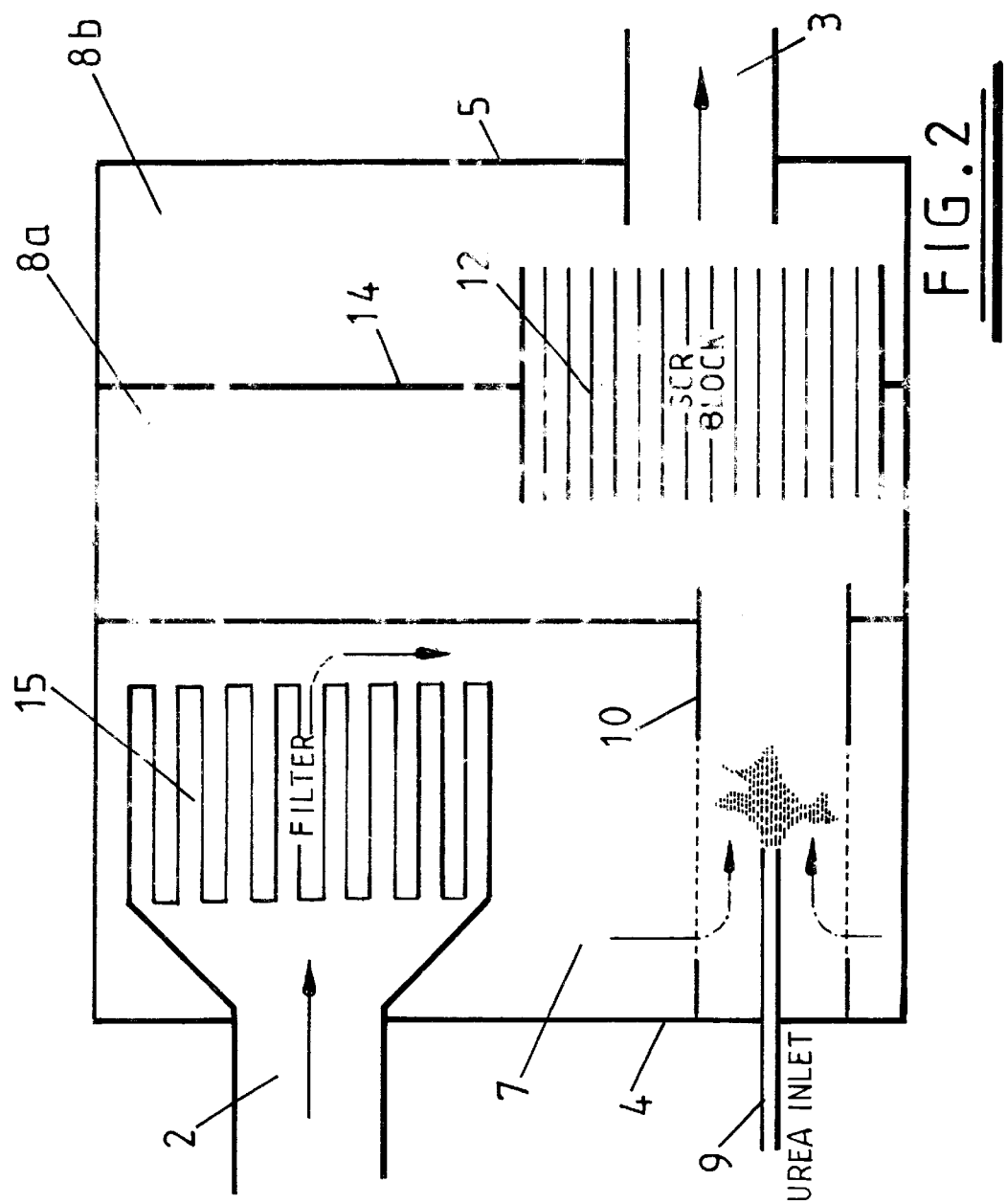
FIG. 2 is a schematic illustration of a second embodiment of an SCR catalytic converter in accordance with the present invention.

Referring to FIG. 2, this is a schematic illustration of an embodiment of the invention which demonstrates how a particulate filter may be incorporated in the catalytic converter, dispensing with the need for a separate filter box upstream of the catalytic converter whilst maintaining an overall compact structure. In the following description features common to the embodiments of FIGS. 1 and 2 will be given the reference numerals used in FIG. 1. Thus, referring to FIG. 2 the illustrated catalytic converter comprises a housing 1 provided with an exhaust gas inlet 2 and an exhaust gas outlet 3 and an internal wall 6 which divides the interior space of the housing 1 into an upstream chamber 7 and a downstream chamber 8 which houses the SCR block 12. In fact, in this embodiment the downstream chamber 8 is divided by a further interior wall 14 into portions 8a and 8b which ensures that all exhaust gas flows through the SCR block 13 before passing to the exhaust gas outlet 3. As with the first embodiment, a urea injection pipe 9 extends through the end wall 4 of the housing 1 into the upstream chamber 7 and is surrounded by a perforated tube 10 which extends across the upstream chamber 7 and into the downstream chamber 8 adjacent the SCR block 12.

The significant difference between the second embodiment and the first embodiment is the inclusion in the second embodiment of a particle filter 15 within the upstream chamber 7 laterally adjacent the tube 10. The exhaust gas inlet 2 is modified to channel all of the incoming exhaust gas through the filter before passing to the tube 10. Aside from the inclusion of the particulate filter 15 operation of the catalytic converter is essentially the same as that of the converter of FIG. 1.

Figure 3:
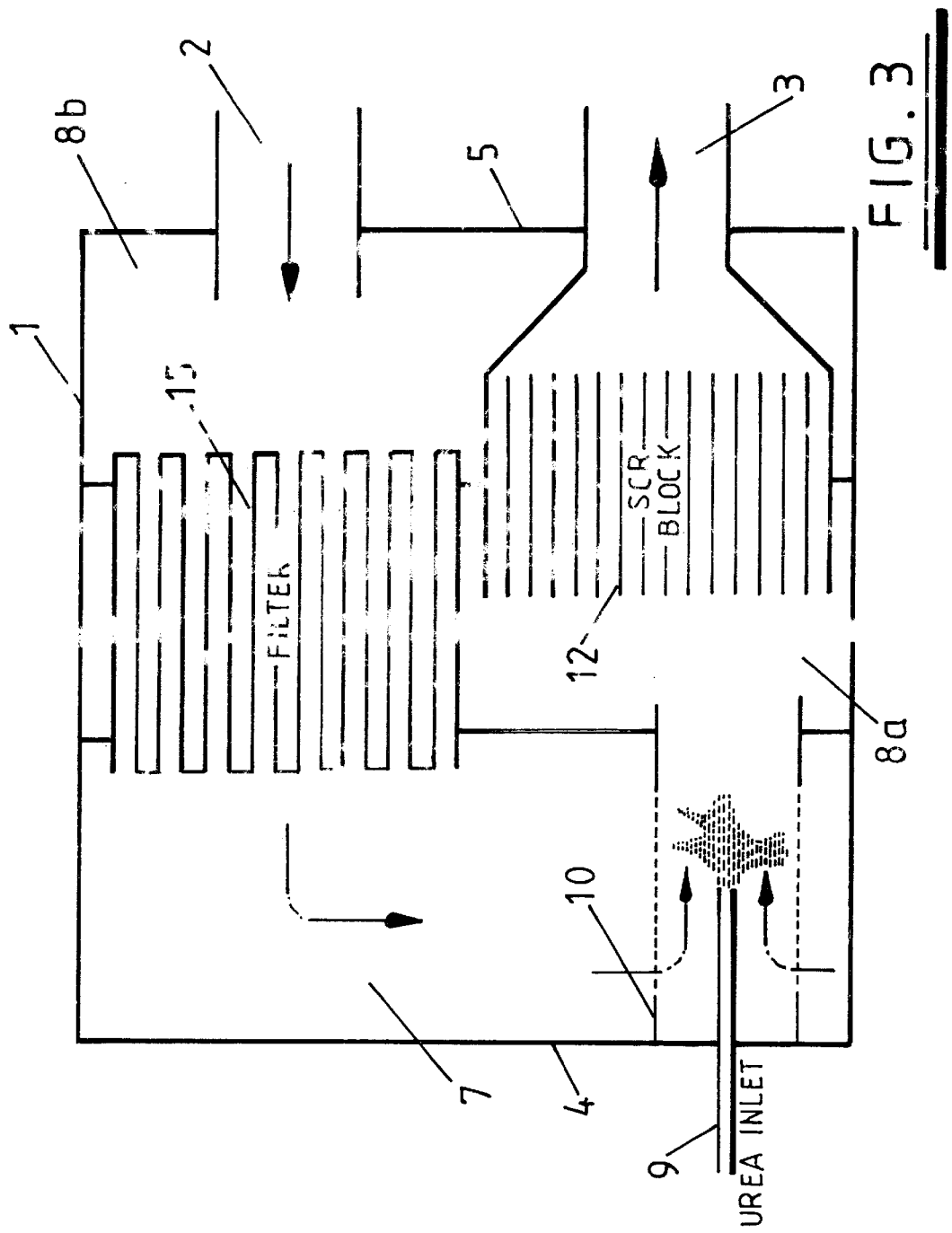
FIG. 3 is a schematic illustration of a third embodiment of an SCR catalytic converter in accordance with the present invention.

FIG. 3 illustrates a modification of the catalytic converter illustrated in FIG. 2 in which the exhaust gas inlet is located at the same end of the housing as the exhaust gas outlet. Again, features common to both embodiments will be identified by the same reference numerals. Thus, referring to FIG. 3 it will be seen that the exhaust gas outlet 3 is modified to channel exhaust gas directly away from the SCR block 15 so that the exhaust gas outlet 3 is effectively sealed from the downstream chamber portion 8b. The exhaust gas inlet 2 is also provided in the end wall 5 thus directing inlet gas into the chamber 8b. A particular filter 15 extends between chamber 8b and the chamber 7 so that the incoming exhaust gas is channelled from chamber 8b, through the filter 15, into chamber 7 thus crossing, but not entering, chamber 8a. The exhaust gas is then mixed with the urea in the same way as with the embodiments of FIGS. 1 and 2 before passing into the chamber 8a and to the SCR block 12.

It will be appreciated that many further modifications could be made to the embodiments described above, both to the overall structure and to the detail of the various components. For instance, the tube 10 need not be cylindrical and need not have a uniform cross-section. Similarly, whilst it is preferable to have holes provided around the entire circumference of the tube 10 to maximise exhaust gas flow into the tube this need not be the case in all embodiments. For instance, the tube could lie adjacent a side wall of the housing 1 or in essence be replaced by an interior wall which together with a portion of the side and/or end wall of the housing provides the necessary enclosure around the urea injector pipe.

It will also be appreciated that the urea injector pipe could have a number of different forms. In the illustrated example, for instance, urea is injected from the end of the pipe along the axis of the tube 10. The pipe could additionally or alternatively be provided with radial holes 17 to eject urea laterally from the pipe as shown in FIG. 3. For example, a series of radial holes 17 provided along the length of the pipe which extends into the tube 10 could provide more rapid dispersion and mixing of the urea within the exhaust gas.

The catalytic converter structures described above also provide a degree of acoustic reduction. This may be enhanced by including noise reducing baffles or similar structures within the catalytic converter housing in a suitably adapted modification of the basic embodiments illustrated.

While reference is made above to the injection of a urea/water solution into the exhaust gas flow it will be appreciated that the invention is not limited to use of urea but will have utility wherever thorough mixing of a reducing agent within the exhaust gas flow is required upstream of a catalyst bed.

Finally, although the catalytic converter constructions schematically illustrated above have been designed for particular application to a vehicle exhaust system the invention is not limited to application in vehicle exhaust systems and may be used in other applications where it is necessary to reduce unwanted emissions from internal combustion engine exhaust gases.

Having thus described the invention, what is desired to be secured by Letters Patent of the United States is:

1. A catalytic converter assembly comprising:
    a housing having an exhaust gas inlet and an exhaust gas outlet, an exhaust gas low path being defined through the housing from said inlet to said outlet;
    a first chamber enclosed by the housing receiving incoming exhaust gas;
    a second chamber enclosed by the housing downstream of and immediately adjacent said first chamber and containing a catalyst bed;
    an exhaust gas passage from said first chamber to said second chamber;
    a perforated tubular enclosure surrounding said passage within said first chamber to induce a region of turbulence in the exhaust gas flow within said enclosure immediately upstream of said passage; said tubular enclosure having a further portion extending through said passage and into said second chamber;
    an injector extending into said enclosure for injecting a reducing agent into said region of turbulence;
    whereby the reducing agent is rapidly dispersed and mixed within the exhaust gas flow before reaching the catalyst bed.

2. A catalytic converter assembly according to claim 1, wherein said injector extends into said first chamber through a wall of said chamber, and wherein said enclosure extends from said wall to said passage.

3. A catalytic converter assembly according to claim 2, wherein said wall is an outer wall of the housing.

4. A catalytic converter assembly according to claim 3, further comprising a particulate filter located within said housing between said exhaust gas inlet and said perforated enclosure.

5. A catalytic converter assembly according to claim 4, wherein said particulate filter is mounted within said first chamber adjacent said perforated enclosure.

6. A catalytic converter assembly according to claim 4, wherein said particulate filter is mounted between said first chamber and an inlet chamber which receives exhaust gas from the exhaust gas inlet.

7. A catalytic converter assembly according to claim 6, wherein the housing has opposite end walls and wherein said exhaust gas inlet is provided in one end wall and said exhaust gas outlet is provided in the other end wall.

8. A catalytic converter assembly according to claim 6, wherein said housing has opposite end walls and said exhaust gas inlet and exhaust gas outlet are provided in the same end wall.

9. A catalytic converter assembly according to claim 1, wherein said injector comprises a pipe extending into said enclosure.

10. A catalytic converter assembly according to claim 9, wherein said enclosure is defined by a perforated tube and said pipe extends along the axis of said tube.

11. A catalytic converter assembly according to claim 1, wherein said injector is adapted to spray said reducing agent in a plurality of directions.

12. A catalytic converter assembly according to claim 11, wherein said injector comprises a pipe provided with radial holes to spray reducing agent into said enclosure.

* * * * *